(12) United States Patent  (10) Patent No.: US 7,944,565 B2
Kitamura  (45) Date of Patent: May 17, 2011

(54) SEMICONDUCTOR RING LASER GYRO

(75) Inventor: Atsushi Kitamura, Shizuoka (JP)

(73) Assignee: Minebea Co., Ltd., Kitasaku-gun (JP)

( * ) Notice: Subject to any disclaimer, the term of this patent is extended or adjusted under 35 U.S.C. 154(b) by 526 days.

(21) Appl. No.: 12/163,611

(22) Filed: Jun. 27, 2008

(65) Prior Publication Data

US 2009/0027684 A1    Jan. 29, 2009

(30) Foreign Application Priority Data

Jul. 27, 2007  (JP) .................................. 2007-196551

(51) Int. Cl.
*G01C 19/66* (2006.01)
(52) U.S. Cl. ....................................................... 356/468
(58) Field of Classification Search .................. 356/459, 356/462, 468
See application file for complete search history.

(56) References Cited

U.S. PATENT DOCUMENTS

| 4,592,043 | A | * | 5/1986 | Williams | 398/79 |
| 7,791,733 | B2 | * | 9/2010 | Kitamura | 356/471 |
| 2009/0027684 | A1 | * | 1/2009 | Kitamura | 356/462 |
| 2009/0051922 | A1 | * | 2/2009 | Kitamura | 356/459 |
| 2009/0086212 | A1 | * | 4/2009 | Kitamura | 356/460 |
| 2010/0046000 | A1 | * | 2/2010 | Kitamura et al. | 356/461 |

FOREIGN PATENT DOCUMENTS

| JP | 2001-50753 A | 2/2001 |
| JP | 2003-139539 A | 5/2003 |
| JP | 2006-319104 A | 11/2006 |

* cited by examiner

*Primary Examiner* — Patrick J Connolly
(74) *Attorney, Agent, or Firm* — Oliff & Berridge, PLC

(57) ABSTRACT

A semiconductor ring laser gyro includes: a semiconductor laser for emitting light from each end of the gyro; at least one reflection prism comprising a plurality of reflection surfaces for forming an optical circuit, the at least one reflection prism adapted to receive and internally reflect the light emitted from the semiconductor laser; a transmissive mirror disposed at one of the plurality of reflection surfaces of the at least one reflection prism and adapted to transmit part of the light traveling clockwise and part of the light traveling counter-clockwise through the optical circuit; and a beam multiplexing prism for multiplexing the light transmitted through the transmissive mirror.

5 Claims, 4 Drawing Sheets

SEMICONDUCTOR RING LASER GYRO

REFERENCE TO THE RELATED APPLICATIONS

This application claims priority under 35 U.S.C. §119 to Japanese Patent Application No. JP2007-196551 filed on Jul. 27, 2007, the entire content of which is hereby incorporated by reference.

BACKGROUND OF THE INVENTION

1. Field of the Invention

The present invention relates to a semiconductor ring laser gyro incorporating a semiconductor as a light source, and particularly to a semiconductor ring laser gyro including a reflection prism for an optical circuit.

2. Description of the Related Arts

A gyroscope has been conventionally known as a means of measuring the angular velocity of an object. Among others, a ring laser gyro, which utilizes the Sagnac effect to precisely measure the angular velocity, is widely used, particularly in the aircraft and rocket industries. While an He—Ne gas laser is primarily used as s laser light source for the ring laser gyro described above, a semiconductor laser, which is advantageous in reduction of device size and power consumption, is recently used increasingly (refer to, for example, Japanese Patent Applications Laid Open Nos. 2001-50753, 2003-139539 and 2006-319104).

FIG. 8 shows a conventional semiconductor ring laser gyro, in which a semiconductor laser 30, four mirrors 31 to 34, and two interference light (beat light) pickup mirrors 35 and 36 are mounted on a silicon substrate. The semiconductor laser 30 has its both ends provided with an antireflection coating and emits two lights respectively from the both ends (refer to Japanese Patent Application Laid-Open No. 2006-319104). One light emitted from one end of the semiconductor laser 30 takes a path such that the light impinges on the mirrors 31, 34, 33 and 32 in this order and falls incident on the other end of the semiconductor laser 30 while the other light emitted from the other end surface of the semiconductor laser 30 takes another path such that the light impinges on the mirrors 32, 33, 34 and 31 in this order and falls incident on the one end of the semiconductor laser 30. This optical circuit functions as a ring resonator, and a laser oscillation occurs at the both ends of the semiconductor laser 30. The four mirrors 31 to 34 are fabricated by anisotropic etching of a silicon substrate (silicon micromachining technique), and a metal coating or a dielectric multilayer coating is provided (refer to Japanese Patent Application Laid-Open No. 2003-139539, Paragraph 0037). At least one of the four mirrors 31 to 34 is a transmissive mirror adapted to introduce part of the light to the beat light pickup mirrors 35 and 36.

In the semiconductor ring laser gyro described above, when an object rotates about a rotation axis (sensitivity axis) defined by the normal line of the silicon substrate, an optical path difference is generated due to the Sagnac effect between the two paths of the lights traveling in the respective directions opposite to each other, and a beat signal based on an oscillation frequency difference is detected. An angular velocity Ω is calculated by a frequency Δf of the beat signal (refer to Japanese Patent Application Laid-Open No. 2006-319104, Paragraph 0015) according to formula 1 shown below:

$$\Delta f = \frac{4A}{\lambda L}\Omega \qquad \text{formula 1}$$

where A is an area enclosed by the ring optical path, λ is an oscillation wavelength of the ring laser, and L is a length of the ring optical path.

The semiconductor ring laser gyro using application of the silicon micromachining technique is excellent in that a plurality of mirrors are fabricated to be positioned with a high precision, but an expensive equipment is required for anodic bonding a silicon substrate and a glass substrate. Also, since the reflectance of silicon has a large wavelength dependence, the wavelength of a semiconductor laser is restricted. Further, a mirror may be provided with a reflection coating for the purpose of increasing a reflectance with respect to a certain wavelength, but an advanced coating technique is required for uniformly applying a metal coating or a dielectric multilayer coating to an etching surface rising vertically on the silicon substrate.

It possibly happens depending on use environment that the semiconductor ring laser gyro receives an impact with a large acceleration, and if the optical axis is shifted significantly by the impact, the ring oscillation is stopped. Also, the ring laser gyro usually prevents the lock-in phenomenon by means of dithering the ring laser gyro relative to the sensitivity axis at a frequency higher than the beat frequency, and the optical axis can possibly be shifted also by the dithering.

SUMMARY OF THE INVENTION

The present invention has been made in light of the above problems, and it is an object of the present invention to provide a semiconductor ring laser gyro which can be produced easily and inexpensively, and which is little influenced by disturbances so as to reliably achieve accuracy in measurement.

According to an aspect of the present invention, there is provided a semiconductor ring laser gyro A semiconductor ring laser gyro comprising: a semiconductor laser for emitting light from each end of the gyro; at least one reflection prism comprising a plurality of reflection surfaces for forming an optical circuit, the at least one reflection prism adapted to receive and internally reflect the light emitted from the semiconductor laser; a transmissive mirror disposed at one of the plurality of reflection surfaces of the at least one reflection prism and adapted to transmit part of the light traveling clockwise and part of the light traveling counterclockwise through the optical circuit; and a beam multiplexing prism for multiplexing the light transmitted through the transmissive mirror.

In the aspect of the present invention, the semiconductor ring laser gyro may include a plurality of reflection prisms, and at least one of the plurality of reflection prisms may be a corner cube prism.

In the aspect of the present invention, the semiconductor ring laser gyro may include one reflection prism having a plurality of reflection surfaces, and the optical circuit may be formed by the plurality of reflection surfaces of the reflection prism.

In the aspect of the present invention, the beam multiplexing prism may be bonded to the reflection surface having the transmissive mirror.

In the aspect of the present invention, the reflection prism and the beam multiplexing prism may be made of the same material.

Accordingly, the semiconductor ting laser gyro of the present invention can be produced easily and inexpensively and are little influenced by disturbances thus stably achieving a measurement precision.

DETAILED DESCRIPTION OF THE INVENTION

Exemplary embodiments of the present invention will hereinafter be described with reference to the accompanying drawings.

Figure 1:
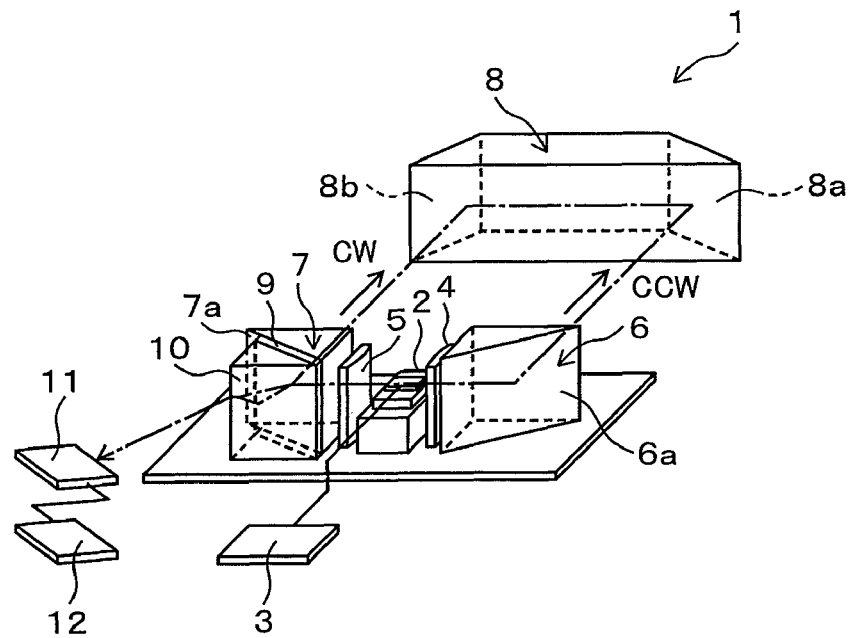
FIG. 1 is a schematic perspective view of a semiconductor ring laser gyro according to a first embodiment of the present invention.
Figure 2:
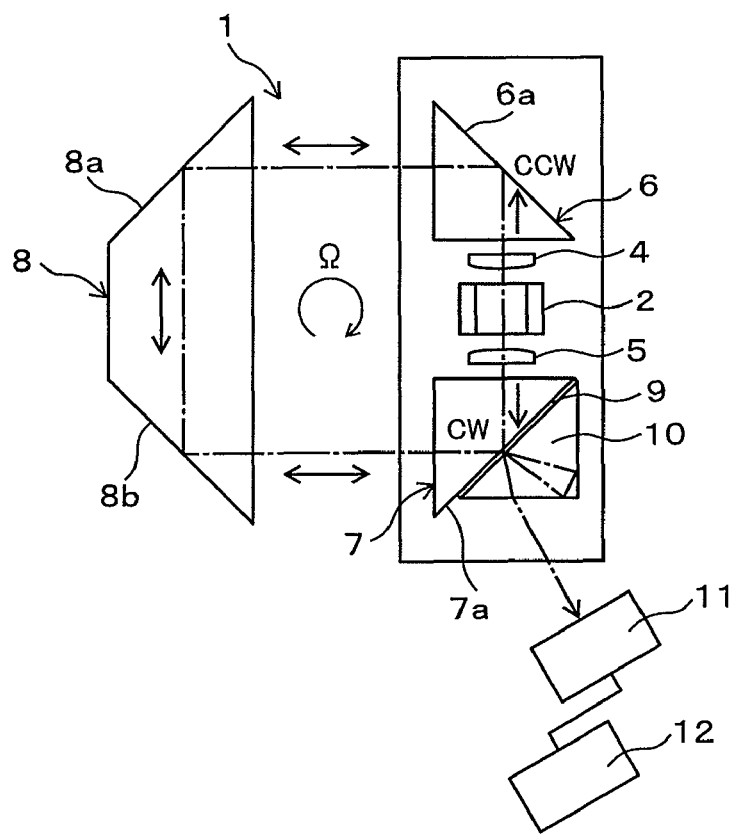
FIG. 2 is a schematic top plan view of the semiconductor ring laser gyro of FIG. 1.

A first embodiment of the present invention will be described with reference to FIGS. 1 and 2.

A semiconductor ring laser gyro 1 according to the first embodiment is an example which incorporates two rectangular prisms and one trapezoidal prism for an optical circuit. Specifically, referring FIG. 1 or 2, the semiconductor ring laser gyro 1 includes a semiconductor laser 2, a driving power supply 3, two collimator lenses 4 and 5, two rectangular prisms 6 and 7, a trapezoidal prism 8, a transmissive mirror 9, a beam multiplexing prism 10, a light receiving portion, and a signal processing portion 12.

The semiconductor laser 2 is made of AlGaAs or GaAs material to emit light with a wavelength of a visible light or an infrared light, and is composed of a normal double heterostructure including an n-type cladding layer/an active layer/a p-type cladding layer, electrodes, and the like, wherein an antireflection coating is applied to each of both end surfaces of the active layer. The semiconductor laser 2 emits light from each of the both end surfaces of the active layer and is set as a part of a ring resonator. The antireflection coating is constituted by a dielectric substance or dielectric multi-layers determined in view of the refractive index and the chemistry of the active layer of the semiconductor laser 2.

The driving power supply 3 is connected to the electrodes of the semiconductor laser 2 and applies a voltage between the electrodes thereby causing stimulated-emission of a photon from the active layer of the semiconductor laser 2. Light generated by the stimulated-emission emerges from each of the both end surfaces of the active layer. Light of stimulated-emission emerging from one end surface of the active layer and emitted from one end of the semiconductor laser 2 goes through the ring resonator, falls incident on the other end of the of the semiconductor laser 2 and enters the active layer from the other end surface, and stimulated-emission of a photon is newly caused, whereby the semiconductor laser 2 generates laser oscillation. The semiconductor ring laser gyro 1 using a semiconductor laser as a laser light source as described above has an advantage in reducing device size and power consumption compared with a ring laser gyro using an He—Ne gas laser.

The collimator lenses 4 and 5 are a plano-convex lens which is made of one of quartz glass ($SiO_2$), transparent plastic resin (thermoplastic resin, acrylic resin, polycarbonate resin, polyolefin resin, and the like), calcium fluoride ($CaF_2$), lithium fluoride (LiF), magnesium fluoride ($MgF_2$), and the like, and which has its surface provided with an antireflection coating. The collimator lenses 4 and 5 are disposed respectively at the both ends of the semiconductor laser 2 to be aligned on the light emission axis of the semiconductor laser 2. The lights emitted respectively from the both end surfaces of the active layer of the semiconductor laser 2 are each collimated by the collimator lens 4/5 to become a parallel light and each impinge on the rectangular prism 6/7 (to be detailed later). In this connection, the collimator lens 4/5 may be a separate member from the rectangular prism 6/7 as shown in FIGS. 1 and 2, or may alternatively be integrated with the rectangular prism 6/7 such that the light entrance surface of the rectangular prism 6/7 is aspheric. In the case of the integration structure, a mounting mechanism for the collimator lenses 4 and 5 is not required, which results in reducing influences attributable to the disturbances such as dithering for prevention of the lock-in phenomenon.

The rectangular prism 6/7 is made of one of the above-mentioned materials for the collimator lens 4/5, possibly using the same material as the collimator lens 4/5, and is disposed on the light emission axis of the semiconductor laser 2 such that the collimator lens 4/5 is sandwiched between the rectangular prism 6/6 and the semiconductor laser 2. A reflection surface 6a/7a of the rectangular prism 6/7 is inclined at 45 degrees relative to the light emission axis of the semiconductor laser 2 as shown in FIG. 2. The rectangular prisms 6 and 7 are disposed with their respective reflection surfaces 6a and 7a arranged line symmetric to each other with respect to the semiconductor laser 2. The parallel light from the collimator lens 4/5 falls incident on the light entrance surface of the rectangular prism 6/7, is internally reflected at 45 degrees at the reflection surfaces 6a/7a and exits the rectangular prism 6/7 from the light exit surface. An refractive index n of the rectangular prism 6/7 is calculated from the Snell's law according to formula 2 shown below, and if the refractive index of air is 1, the rectangular prism 6/7 has a refractive index n of about 1.4 or more:

$$n \geq 1/\sin \theta \qquad \text{formula 2}$$

The trapezoidal prism 8 is made of one of the above-mentioned materials for the collimator lens 4/5, possibly using the same material as the collimator lens 4/5, and is disposed such that two reflection surfaces 8a and 8b thereof are inclined at 45 degrees relative to the light emission axis of the rectangular prisms 6 and 7 and are line symmetric respectively to the reflection surfaces 6a and 7a of the rectangular prisms 6 and 7. The light emitted from the rectangular prism 6/7 and introduced in the trapezoidal prism 8 is internally reflected at the reflection surface 8a/8b then at the reflection surface 8b/8a, and exits the trapezoidal prism 8. The trapezoidal prism 8 also has a refractive index n of about 1.4 or more according to formula 2 shown above. In the present embodiment, the trapezoidal prism 8 emits light in the direction parallel to the incoming light, and therefore it is easy to align the optical axis.

In the semiconductor ring laser gyro 1 described above, the optical circuit is formed into a rectangular configuration by using internal reflection at the two rectangular prisms 6 and 7 and the trapezoidal prism 8. Since the rectangular prisms 6 and 7 and the trapezoidal prism 8 are made of an inexpensive material thus not requiring expensive production equipment, the semiconductor ring laser gyro 1 can be produced inexpensively. Also, since the process of forming a metal coating or a dielectric multilayer coating on the reflection surfaces of the rectangular prisms 6 and 7 and the trapezoidal prism 8 is not required, and since the rectangular prisms 6 and 7 and the trapezoidal prism 8 are arranged only such that the reflection surfaces 6a and 7a are disposed line-symmetric to the reflection surfaces 8a and 8b on the optical axis, the semiconductor ring laser gyro 1 can be produced easily. Further, since the optical circuit is formed by using internal reflection at the rectangular prisms 6 and 7 and the trapezoidal prism 8, the reflectance is little affected by dusts or scratches.

The transmissive mirror 9 is a partially transmissive film or a semi-transmissive film (half mirror) made of a dielectric multilayer coating composed of high refractive coatings H and low refractive coatings L deposited alternately on each other (for example, H:$TiO_2$, L:$SiO_2$) or a metal coating (Al, Au, Ag and the like). The transmissive mirror 9 is formed on one of the reflection surfaces (6a, 7a, 8a, 8b) of the rectangular prisms 6 and 7 and the trapezoidal prism 8 which constitute the optical circuit. In the present embodiment, the transmissive mirror 9 is formed on the reflection surface 7a of the rectangular prism 7 as shown in FIGS. 1 and 2, and therefore a CW light traveling clockwise in the optical circuit and a CCW light traveling counterclockwise in the optical circuit are adapted to partly transmit through the reflection surface 7a. The two lights having transmitted through the reflection surface 7a impinge on the beam multiplexing prism 10.

The beam multiplexing prism 10 is made of one of the above-mentioned materials for the collimator lens 4/5, possibly using the same material as the collimator lens 4/5, and is disposed at one of the reflection surfaces (6a, 7a, 8a, 8b) of the rectangular prisms 6 and 7 and the trapezoidal prism 8 which constitute the optical circuit, wherein the one reflection surface has the transmissive mirror 9 formed thereon. In this particular embodiment, the beam multiplexing prism 10 is disposed at the reflection surface 7a of the rectangular prism 7 having the transmissive mirror 9 formed thereon. Since the multiplexing prism 10 is fixedly disposed in tight contact with the transmissive mirror 9 which is formed directly on the reflection surface 7a of the rectangular 7, the optical path is reliably settled and therefore influences from the disturbances such as dithering for prevention of the lock-in phenomenon are reduced. Also, the CW light and the CCW light are internally reflected in the beam multiplexing prism 10 so as to align their respective light emission axes with each other, whereby a composite wave of the CW and CCW lights, that is an interference light (beat light), is produced. The beat light of the CW and CCW lights falls incident on the light receiving portion 11.

The light receiving portion 11 is constituted by a photo diode, a photo transistor, a photo IB, or the like and disposed on the light emission axis of the beam multiplexing prism 10. The light receiving portion 11 receives the beat light emitted from the beam multiplexing prism 10 and converts the light amount into a current value. The current is optimally amplified by an operational amplifier and converted into a voltage value via a variable resistor. The voltage value is compared with a reference voltage by a comparator (not shown) and converted into a pulse signal (beat signal), 0 or 1.

The signal processing portion 12 is a microcomputer which includes a ROM to store a program and data, a CPU to process a signal based on the program stored, a RAM to temporarily store the program and data executed by the CPU, a counter to count a clock number of a pulse signal, and a clock oscillator. The beat signal from the light receiving portion 11 is inputted to the signal processing portion 12, and the counter counts the clock number of the beat signal (beat frequency). The signal processing portion 12 calculates an angular velocity from the beat frequency measured. Thus, the semiconductor ring laser gyro 1 is adapted to measure the rotational angular velocity of an object by means of the Sagnac effect (difference between the optical paths of CW and CCW lights) that is produced when the object rotates.

Description will now be made on the advantages of the first embodiment. Since the optical circuit is made up of the rectangular prisms 6 and 7 and the trapezoidal prism 8 which are inexpensive constituent members and is produced without using expensive equipment, the semiconductor ring laser gyro 1 can be produced inexpensively. Also, since the optical circuit uses the internal reflection at the rectangular prisms 6 and 7 and the trapezoidal prism 8, an advanced coating process is not required. Since the reflection surfaces 6a and 7a of the rectangular prisms 6 and 7 are disposed on the optical axis symmetrically respectively to the reflection surfaces 8a and 8b of the trapezoidal prism 8, the optical axis alignment is easy, and also the degree of freedom in optical axis adjustment is high, which allows an easy production. Further, when the collimator lenses 4 and 5, the rectangular prisms 6 and 7, the trapezoidal prism 8, and the beam multiplexing prism 10, which form the optical path, are made of the same material, the semiconductor ring laser gyro 1 can be produced easily and inexpensively, wherein there is no difference in thermal expansion coefficient between those members thus giving no difference in refractive index fluctuation due to temperature change. Consequently, the semiconductor ring laser gyro 1 is influenced little by disturbances thus stably achieving a high precision measurement.

A second embodiment of the present invention will be described with reference to FIGS. 3 and 4.

A semiconductor ring laser gyro 13 according to the second embodiment incorporates two rectangular prisms and one corner cube prism for an optical circuit. In explaining the second embodiment, any component parts corresponding to those in FIGS. 1 and 2 are denoted by the same reference numerals, and a detailed description thereof will be omitted below.

Figure 3:
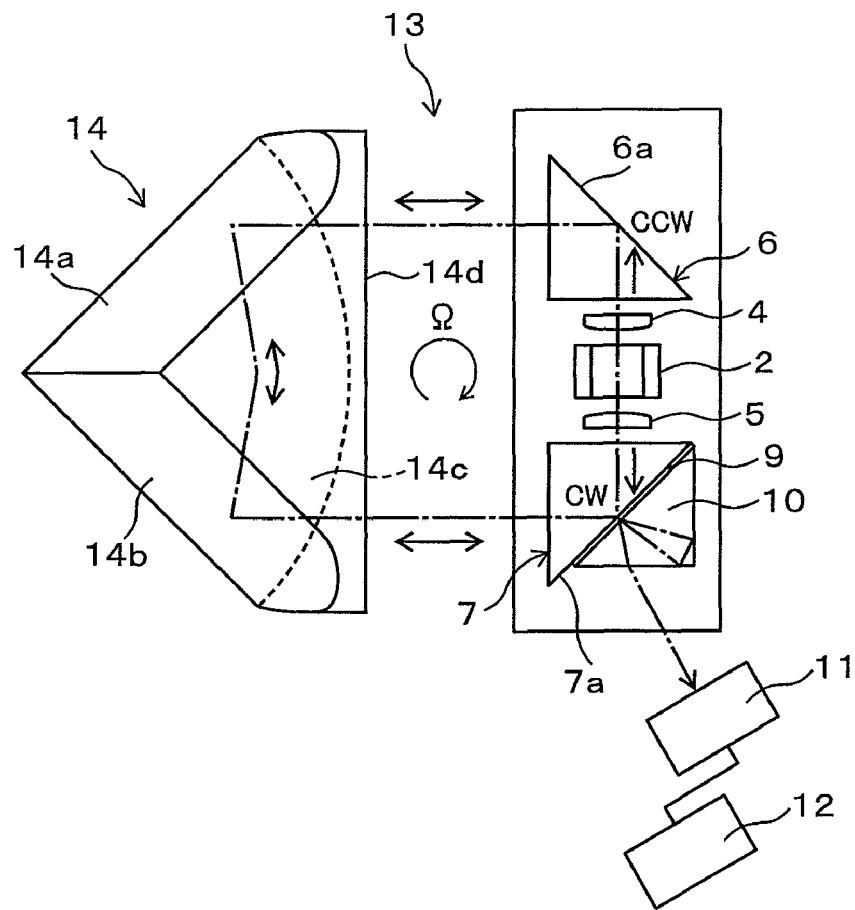
FIG. 3 is a schematic top plan view of a semiconductor ring laser gyro according to a second embodiment of the present invention.
Figure 4:
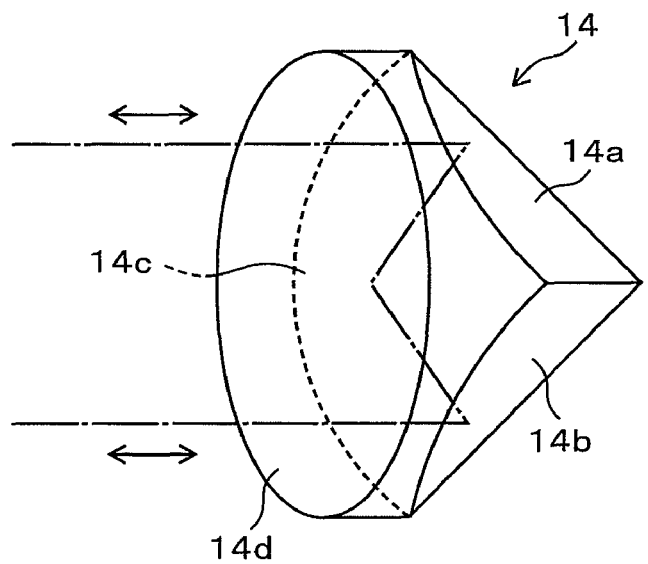
FIG. 4 is a schematic perspective view of a corner cube prism of the semiconductor ring laser gyro of FIG. 3.

Referring to FIG. 3, the semiconductor ring laser gyro 13 includes the same constituent members as the semiconductor ring laser gyro 1 of the first embodiment except that a corner cube prism 14 is disposed in place of the trapezoidal prism 8. The corner cube prism 14 is made of one of quartz glass ($SiO_2$), transparent plastic resin (thermoplastic resin, acrylic resin, polycarbonate resin, polyolefin resin, and the like), calcium fluoride ($CaF_2$), lithium fluoride (LiF), magnesium fluoride ($MgF_2$), and the like, and has its surface provided with an antireflection coating. Referring to FIG. 4, the corner cube prism 14 is basically a triangular pyramid made up of four planes with the bottom portion shaped in the form of a circular cylinder, wherein three planes as reflection surfaces 14a, 14b and 14c have a rectangular isosceles triangular shape and are at right angles to one another, and one plane as a bottom surface 14d has a circular shape. In the corner cube prism 14, it is ensured that light incident on the bottom surface 14d and introduced therefrom is internally reflected at either two or three of the reflection surfaces 14a, 14b and 14c so as to exit in the direction parallel to the incident light, and therefore the optical axis alignment is easy for the semiconductor ring laser gyro 13 and also the degree of freedom in optical axis adjustment is high.

In the semiconductor ring laser gyro 13 of FIG. 3, the corner cube prism 14 is disposed such that the bottom surface 14d is perpendicular to the light incidence axis, and also that a plane including the light incidence axis and the apex of the corner prism 14 is perpendicular to the sensitivity axis of the semiconductor ring laser gyro 13. In this structure, light incident on the bottom surface 14d and introduced therefrom into the corner cube prism 14 is internally reflected at three reflection surfaces, specifically the reflection surfaces 14a, 14b and 14c and exits the corner cube prism 14 from the bottom surface 14d in the direction parallel to the light incidence axis.

In this connection, the corner cube prism 14 may be disposed such that one of the three reflection surfaces 14a, 14b and 14c (for example 14c) is perpendicular to the sensitivity axis of the semiconductor ring laser gyro 13, and also that the other two reflection surfaces (for example 14a and 14b) are symmetric to reflection surfaces 6a and 7a of rectangular prisms 6 and 7. In this structure light incident on bottom surface 14d and introduced into the corner cube prism 14 is reflected at two reflection surfaces (for example 14a and 14b) and exits the corner cube prism 14 from the bottom surface 14d in the direction parallel to the light incidence axis.

The semiconductor ring laser gyro 13 according to the second embodiment achieves the following advantages.

The semiconductor ring laser gyro 13 including the corner cube prism 14 as a reflection prism, while enjoying the earlier described advantages of the semiconductor ring laser gyro 1 of the first embodiment, is less influenced by disturbances such as dithering for prevention of the lock-in phenomenon and exterior impacts. Specifically, when light is reflected at the three reflection surfaces 14a, 14b and 14c of the corner cube mirror 14, the axis of reflection is basically not shifted even if the rotational displacement occurs with respect to the apex of the corner cube prism 14 due to disturbances or the like. Also, the optical axis alignment is farther eased, and the degree of freedom in optical axis adjustment is further increased.

A third embodiment of the present invention will be described with reference to FIG. 5.

A semiconductor ring laser gyro 15 according to the third embodiment is a variation example of the first or second embodiment. In explaining the third embodiment, any component parts corresponding to those in FIG. 1 or 2 are denoted by the same reference numerals, and a detailed description thereof will be omitted below.

Figure 5:
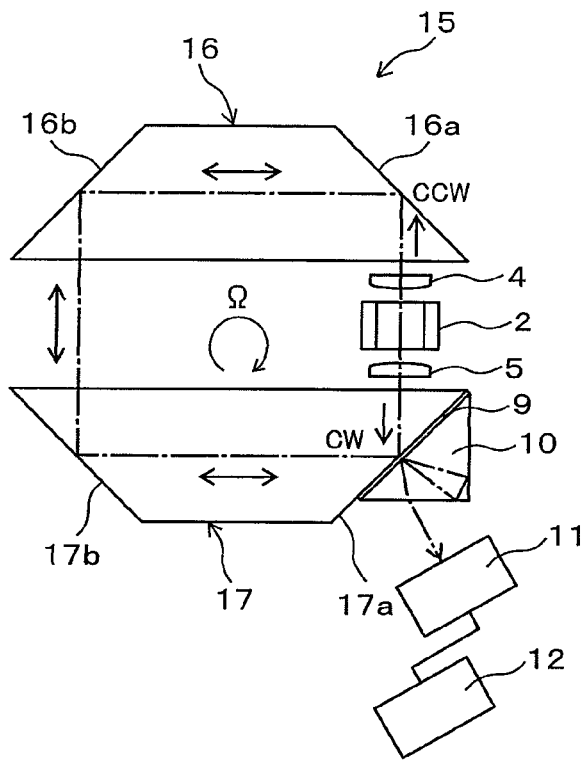
FIG. 5 is a schematic top plan view of a semiconductor ring laser gyro according to a third embodiment of the present invention.

Referring to FIG. 5, the semiconductor ring laser gyro 15 includes two identical trapezoidal prisms 16 and 17 for its optical circuit instead of the two rectangular prisms 6 and 7 and the one trapezoidal prism 8 incorporated in the semiconductor ring laser gyro 1 of the first embodiment, wherein each of the trapezoidal prisms 16 and 17 is the same as or comparable to the trapezoidal prism 8 of the first embodiment. The trapezoidal prisms 16 and 17 are disposed such that reflection surfaces 16a and 16b of the trapezoidal prism 16 are symmetric respectively to reflection surfaces 17a and 17b of the trapezoidal prism 16 with respect to a semiconductor laser 2. The third embodiment may employ, in place of the two trapezoidal prisms 16 and 17, two corner cube prisms each of which is the same as or comparable to the corner cube prism 14 described in the second embodiment, wherein the two corner cube prisms are disposed symmetric to each other with respect to the semiconductor laser 2.

The semiconductor ring laser gyro 15 according to the third embodiment achieves the same advantages as the first and second embodiment, and further is favorable in that the number of components for the optical circuit is reduced thus still further easing the optical axis alignment and still further increasing the degree of freedom in optical axis adjustment.

A fourth embodiment of the present invention will be described with reference to FIG. 6.

A semiconductor ring laser gyro 18 according to the fourth embodiment incorporates a single piece reflection prism having a plurality of reflection surfaces, wherein an optical circuit is formed into a rectangular shape. In explaining the fourth embodiment, any component parts corresponding to those in FIG. 1 or 2 are denoted by the same reference numerals, and a detailed description thereof will be omitted below.

Figure 6:
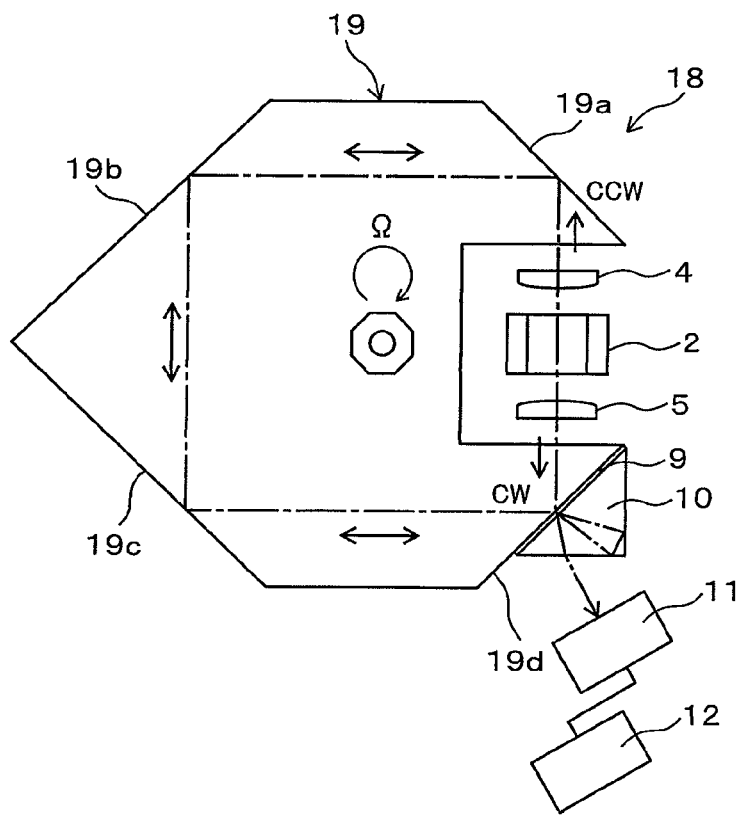
FIG. 6 is a schematic top plan view of a semiconductor ring laser gyro according to a fourth embodiment of the present invention.

Referring to FIG. 6, the semiconductor ring laser gyro 18 has its optical circuit constituted by a polyhedral prism 19 having four reflection surfaces 19a, 19b, 19c and 19d. The polyhedral prism 19 is made of one of quartz glass ($SiO_2$), transparent plastic resin (thermoplastic resin, acrylic resin, polycarbonate resin, polyolefin resin, and the like), calcium fluoride ($CaF_2$), lithium fluoride (LiF), magnesium fluoride ($MgF_2$), and the like. The polyhedral prism 19 includes a recess to lodge a semiconductor laser 2 and collimator lenses 4 and 5. The reflection surfaces 19a, 19b, 19c and 19d are oriented at 45 degrees with respect to respective light incidence axes.

The semiconductor ring laser gyro 18 according to the fourth embodiment has the same advantages as the preceding embodiments and also is advantageous in reducing influence caused by disturbances such as refractive index fluctuation due to temperature change and dithering for prevention of the lock-in phenomenon.

A fifth embodiment of the present invention will be described with reference to FIG. 7.

A semiconductor ring laser gyro 20 according to the fifth embodiment incorporates a single piece reflection prism having a plurality of reflection surfaces, wherein an optical circuit is formed into a triangular shape. In explaining the fourth embodiment, any component parts corresponding to those in FIG. 1 or 2 are denoted by the same reference numerals, and a detailed description thereof will be omitted below.

Figure 7:
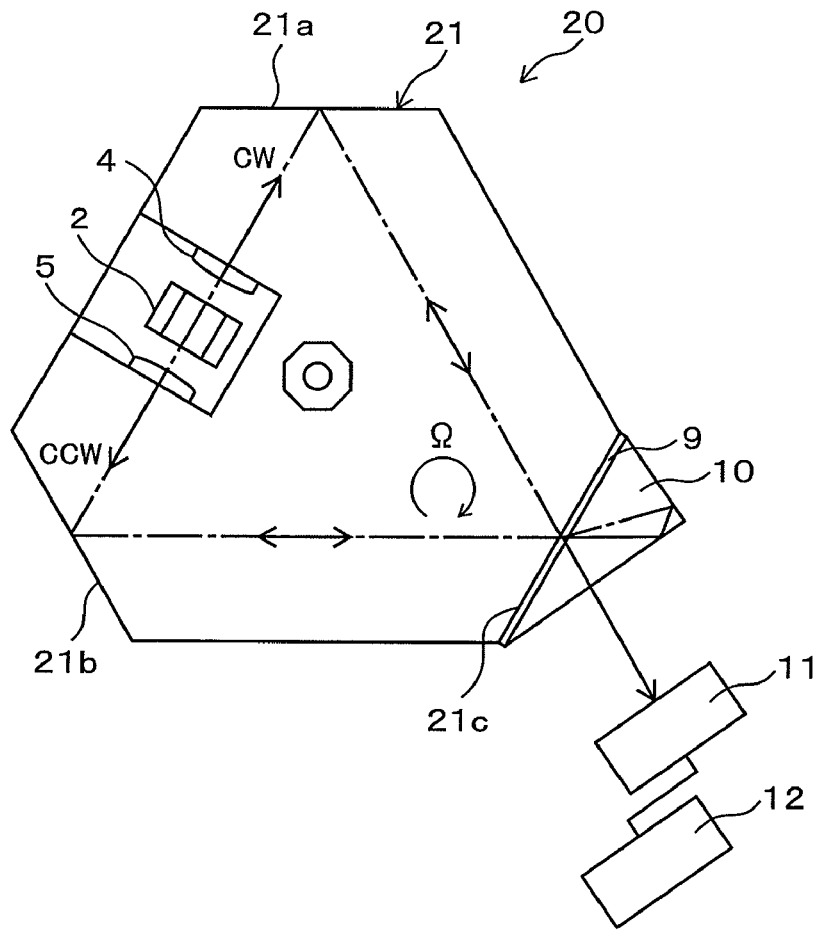
FIG. 7 is a schematic top plan view of a semiconductor ring laser gyro according to fifth embodiment of the present invention.
Figure 8:
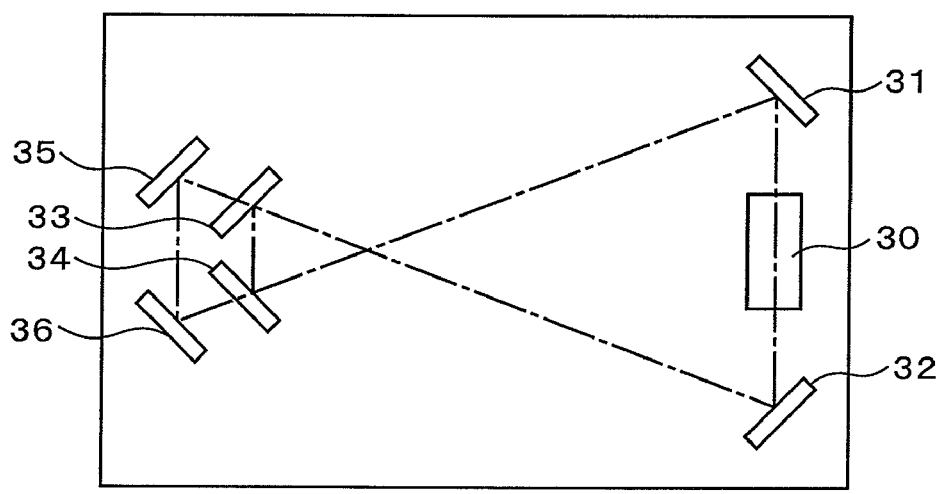
FIG. 8 is a schematic top plan view of a conventional semiconductor ring laser gyro.

Referring to FIG. 7, the semiconductor ring laser gyro 20 has its optical circuit constituted by a polyhedral prism 21 having three reflection surfaces 21a, 21b and 21c. The polyhedral prism 21 is made of one of the above-described materials for the polyhedral prism 19 of the fourth embodiment. The polyhedral prism 21 includes a recess to lodge a semiconductor laser 2 and collimator lenses 4 and 5. The reflection surfaces 21a, 21b and 21c are oriented at 60 degrees with respect respective to respective light incidence axes. The reflection angle is 30 degrees, and therefore the polyhedral prism 21 has a refractive index of about 2 or more according to the earlier described formula 2.

The semiconductor ring laser gyro 20 according to the fifth embodiment has the same advantages as the first and fourth embodiments and also allows an easier optical axis alignment due to a reduced number of reflection surfaces.

The present invention can be used for attitude control of an aircraft, a rocket, a space satellite, a submarine, a robot, an automobile, and the like, and for a semiconductor ring laser gyro for a navigation system.

What is claimed is:

1. A semiconductor ring laser gyro comprising:
   a semiconductor laser for emitting light from each end of the gyro;
   at least one reflection prism comprising a plurality of reflection surfaces for forming an optical circuit, the at least one reflection prism adapted to receive and internally reflect the light emitted from the semiconductor laser;

a transmissive mirror disposed at one of the plurality of reflection surfaces of the at least one reflection prism and adapted to transmit part of the light traveling clockwise and part of the light traveling counterclockwise through the optical circuit; and a beam multiplexing prism for multiplexing the light transmitted through the transmissive mirror.

2. A semiconductor ring laser gyro according to claim 1, wherein the semiconductor ring laser gyro comprises a plurality of reflection prisms, and at least one of the plurality of reflection prisms is a corner cube prism.

3. A semiconductor ring laser gyro according to claim 1, wherein the semiconductor ring laser gyro comprises a reflection prism having a plurality of reflection surfaces, and the optical circuit is formed by the plurality of reflection surfaces of the reflection prism.

4. A semiconductor ring laser gyro according to claim 1, wherein the beam multiplexing prism is bonded to the reflection surface having the transmissive mirror.

5. A semiconductor ring laser gyro according to claim 1, wherein the reflection prism and the beam multiplexing prism are made of the same material.

* * * * *